United States Patent
Feng et al.

(10) Patent No.: US 10,232,392 B2
(45) Date of Patent: Mar. 19, 2019

(54) SEALANT APPLYING DEVICE AND WORKING METHOD THEREOF, AND SEALANT APPLYING APPARATUS

(71) Applicants: BOE TECHNOLOGY GROUP CO., LTD., Beijing (CN); BEIJING BOE DISPLAY TECHNOLOGY CO., LTD., Beijing (CN)

(72) Inventors: Wenchao Feng, Beijing (CN); Xiaoqiang Zeng, Beijing (CN); Hongyu Zhang, Beijing (CN); Lei Xing, Beijing (CN)

(73) Assignees: BOE TECHNOLOGY GROUP CO., LTD., Beijing (CN); BEIJING BOE DISPLAY TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 15/536,414

(22) PCT Filed: Nov. 1, 2016

(86) PCT No.: PCT/CN2016/104171
§ 371 (c)(1),
(2) Date: Jun. 15, 2017

(87) PCT Pub. No.: WO2017/128793
PCT Pub. Date: Aug. 3, 2017

(65) Prior Publication Data
US 2018/0093285 A1    Apr. 5, 2018

(30) Foreign Application Priority Data

Jan. 26, 2016   (CN) .......................... 2016 1 0052799

(51) Int. Cl.
*B05B 9/04*       (2006.01)
*B05B 12/02*      (2006.01)
(Continued)

(52) U.S. Cl.
CPC .............. *B05B 9/0423* (2013.01); *B05B 9/04* (2013.01); *B05B 12/02* (2013.01); *B05B 12/26* (2018.02);
(Continued)

(58) Field of Classification Search
CPC ... B05B 9/0423; B05B 12/26; B05B 15/5223; B05B 15/0225; B05B 15/52; B05B 12/00; B05C 5/0225; B05C 11/1031
(Continued)

(56) References Cited

U.S. PATENT DOCUMENTS 5,350,600 A    9/1994  Kubota
5,647,411 A *  7/1997  Koppe ................. B05C 5/0225
                                                    141/83
(Continued)

FOREIGN PATENT DOCUMENTS

CN    2621821 Y    6/2004
CN    2853189 Y    1/2007
(Continued)

OTHER PUBLICATIONS

The First Chinese Office Action dated Jul. 31, 2017; Appln. No. 201610052799.8.
(Continued)

*Primary Examiner* — Patrick M Buechner
*Assistant Examiner* — Robert Nichols, II
(74) *Attorney, Agent, or Firm* — Ladas & Parry LLP

(57) ABSTRACT

A sealant applying device and a working method thereof, and a sealant applying apparatus are disclosed. The sealant applying device includes a nozzle; the nozzle includes an air inlet portion and a sealant outflow portion, a switch plate is arranged below the sealant outflow portion, the switch plate includes a plate body configured to horizontally move between a first state and a second state, one end of the plate (Continued)

body is provided with a through hole, and a discharge portion is provided at a position corresponding to the through hole and on a side of the plate body facing away from the sealant outflow portion.

13 Claims, 3 Drawing Sheets

(51) Int. Cl.
    *G02F 1/1339* (2006.01)
    *B05B 15/50* (2018.01)
    *B05B 15/522* (2018.01)
    *B05B 12/26* (2018.01)
    *G02F 1/13* (2006.01)

(52) U.S. Cl.
    CPC .......... *B05B 15/50* (2018.02); *B05B 15/5223* (2018.02); *G02F 1/1303* (2013.01); *G02F 1/1339* (2013.01)

(58) Field of Classification Search
    USPC ............ 222/389, 335, 108, 181.1, 559, 571
    See application file for complete search history.

(56) References Cited

U.S. PATENT DOCUMENTS

| | | | | |
|---|---|---|---|---|
| 6,024,250 | A * | 2/2000 | Hickey | .................. B05B 15/52 222/63 |
| 6,267,157 | B1 * | 7/2001 | Gruson | .................. B67C 3/001 141/90 |
| 6,772,917 | B2 * | 8/2004 | Taguchi | ................ G02F 1/1341 222/196 |
| 8,043,443 | B2 * | 10/2011 | Lee | ......................... B08B 1/007 134/115 R |
| 2007/0151512 | A1 * | 7/2007 | Son | ..................... B05C 11/1002 118/300 |
| 2012/0171372 | A1 | 7/2012 | Looi et al. | |
| 2015/0041501 | A1 | 2/2015 | Ineichen et al. | |
| 2015/0041502 | A1 * | 2/2015 | Ineichen | ................ B65D 83/28 222/148 |

FOREIGN PATENT DOCUMENTS

| | | | | |
|---|---|---|---|---|
| CN | 101452157 | A | 6/2009 | |
| CN | 102540579 | A | 7/2012 | |
| CN | 202600312 | A | 12/2012 | |
| CN | 103480591 | A | 1/2014 | |
| CN | 203502706 | U | 3/2014 | |
| CN | 104338643 | A | 2/2015 | |
| CN | 104668151 | A | 6/2015 | |
| CN | 105435984 | A | 3/2016 | |
| EP | 0516897 | A1 * | 12/1992 | ............. G01G 17/06 |
| JP | 10116560 | A | 5/1998 | |
| JP | 2001-314795 | A | 11/2001 | |
| JP | 2003-170093 | A | 6/2003 | |
| JP | 3492231 | B2 | 2/2004 | |
| KR | 20130090269 | A | 8/2013 | |

OTHER PUBLICATIONS

International Search Report and Written Opinion dated Jan. 20, 2017; PCT/CN2016/104171.

* cited by examiner

SEALANT APPLYING DEVICE AND WORKING METHOD THEREOF, AND SEALANT APPLYING APPARATUS

TECHNICAL FIELD

Embodiments of the present disclosure relate to a sealant applying device and a working method thereof and a sealant applying apparatus.

BACKGROUND

A liquid crystal display panel comprises an array substrate and an opposed substrate which are oppositely arranged, and before box-forming of the array substrate and the opposed substrate, it is needed to coat one of the array substrate and the opposed substrate or both the array substrate and the opposed substrate with sealant, so as to seal liquid crystals located between the array substrate and the opposed substrate.

SUMMARY

An embodiment of the present disclosure provides a sealant applying device, comprising a nozzle; the nozzle includes an air inlet portion and a sealant outflow portion, a switch plate is arranged below the sealant outflow portion, the switch plate includes a plate body configured to horizontally move between a first state and a second state, one end of the plate body is provided with a through hole, and a discharge portion is provided at a position corresponding to the through hole and on a side of the plate body facing away from the sealant outflow portion, in a case that the plate body is in the first state, the sealant outflow portion is right opposite to the through hole, and sealant in the nozzle is allowed to be discharged through the discharge portion, and in a case that the plate body is in the second state, the sealant outflow portion is blocked by the plate body to prevent the sealant in the nozzle from being discharged.

For example, in the case that the plate body is in the second state, the through hole is located at a first position, and a suction unit is arranged at the first position; and the suction unit is configured to perform a suction treatment on sealant left in the discharge portion in the case that the plate body is in the second state.

For example, the suction unit includes an air suction pipe and a suction pump, and the suction pump is connected with one end of the air suction pipe; and the suction pump is configured to perform a vacuumizing treatment on the air suction pipe.

For example, the sealant applying device further comprises a clearing unit; the clearing unit is located on one side of the nozzle, and is configured to clear a surface of one side of the plate body, which side faces the sealant outflow portion, during the plate body horizontally moving between the first state and the second state.

For example, the clearing unit comprises a cleaning sponge.

For example, the sealant applying device further comprises a driving unit; the driving unit is connected with the plate body, and is configured to drive the plate body to horizontally move between the first state and the second state.

For example, the switch plate further includes a connecting arm, one end of the connecting arm is connected with the other end of the plate body, and the other end of the connecting arm is connected with the driving unit.

For example, the sealant applying device further comprises an air inlet unit; the air inlet unit is connected with the air inlet portion of the nozzle, and the air inlet unit is configured to output air to the nozzle to allow a preset air pressure in the nozzle.

For example, the discharge portion and the plate body are integrated.

An embodiment of the present disclosure provides a sealant applying apparatus comprising any one of the sealant applying devices.

For example, the sealant applying apparatus further comprises a protecting cavity; the sealant applying device is located in the protecting cavity, a bottom of the protecting cavity is provided with a slide opening, and the discharge portion is located in the slide opening.

For example, the sealant applying apparatus further comprises a driving device; the driving device is connected with the protecting cavity, and the driving device is configured to drive the protecting cavity to move.

An embodiment of the present disclosure provides a working method of a sealant applying device, wherein the sealant applying device is any one of the above-mentioned sealant applying device, and the working method of the sealant applying device comprises: placing the plate body in the first state, in which the sealant outflow portion of the nozzle is right opposite to the through hole, and the sealant in the nozzle is discharged through the discharge portion; and placing the plate body in the second state, in which the sealant outflow portion of the nozzle is blocked by the plate body to prevent the sealant in the nozzle from being discharged.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Figure 1:
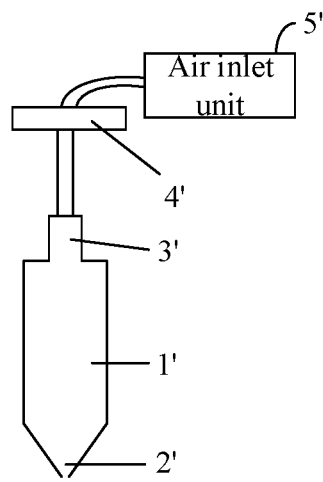
FIG. 1 is a structural schematic diagram of a sealant applying device in the state of art.

FIG. 1 is a structural schematic diagram of a sealant applying device in the state of art. As illustrated in FIG. 1, the sealant applying device comprises: a nozzle 1', an air inlet unit 5' and an electromagnetic valve 4', and the air inlet unit 5' is connected with an air inlet portion 3' of the nozzle through the electromagnetic valve 4'. In operation, a certain amount of sealant (not shown) is stored in the nozzle 1'; at the moment, the air inlet unit 5' outputs air of a certain pressure intensity, and the air enters the nozzle 1' after passing through the electromagnetic valve 4'; under action of air pressure, the sealant is sprayed out through a sealant outflow portion 2' of the nozzle portions of substrates that need to be coated with the sealant are just conveyed to a position below the sealant outflow portion 2' by a conveying device, and therefore the portions of the substrates are coated with the sealant.

In an exemplary coating process, it is needed to continuously adjust the electromagnetic valve 4', so that an amount of air entering the nozzle 1' can be controlled to change pressure intensity in the nozzle, and therefore a sealant outflow amount of the sealant outflow portion 2' is controlled.

However, the electromagnetic valve 4' has a delay in response and is farther away from the nozzle 1 and thus in an exemplary production, it is usually needed to set lots of time parameters to adjust a coating effect, which results in that a linear effect of coating is bad, and control parameters of coating are complex. Meanwhile, in a coating process, a sealant piling phenomenon can happen to the sealant outflow portion 2', especially the sealant piling phenomenon happens to a sealed position of the sealant quite easily, and therefore the error of the actual sealant outflow amount of the sealant outflow portion 2' is very large.

Figure 2:
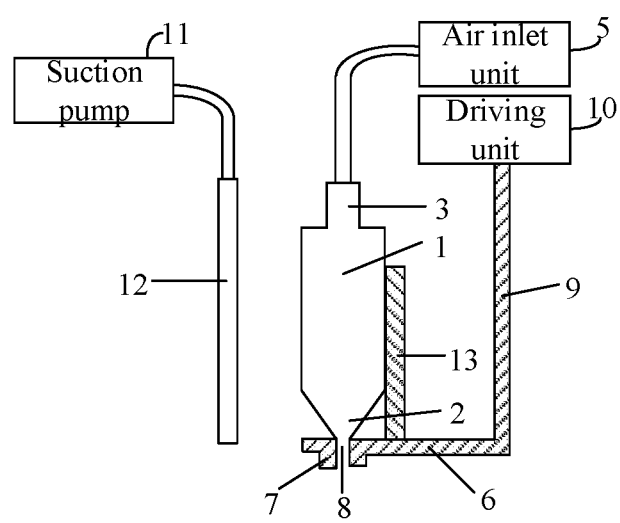
FIG. 2 is a structural schematic diagram of a sealant applying device provided by an embodiment of the present disclosure.
Figure 3:
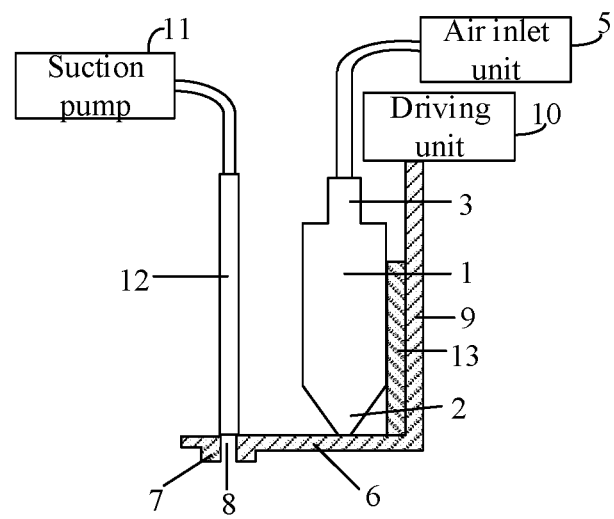
FIG. 3 is a schematic diagram when a plate body in the sealant applying device is in a second state.

FIG. 2 is a structural schematic diagram of a sealant applying device provided by an embodiment of the present disclosure, and FIG. 3 is a schematic diagram when a plate body in the sealant applying device is in a second state. As illustrated in FIG. 2 and FIG. 3, the sealant applying device comprises a nozzle 1, the nozzle 1 includes an air inlet portion 3 and a sealant outflow portion 2, a switch plate is arranged below the sealant outflow portion 2, the switch plate includes a plate body 6, one end of the plate body 6 is provided with a through hole 8, and a position corresponding to the through hole 8 and on a side of the plate body 6 facing away from the sealant outflow portion 2 is provided with a discharge portion 7. In the embodiment of the present disclosure, the plate body 6 can horizontally move between a first state (as illustrated in FIG. 2) and the second state (as illustrated in FIG. 3) according to a user requirement. For example, as illustrated in FIG. 2, when the plate body 6 is in the first state, the sealant outflow portion 2 is right opposite to the through hole 8, and the sealant in the nozzle 1 is discharged through the discharge portion 7; as illustrated in FIG. 3, when the plate body 6 is in the second state, the sealant outflow portion 2 is completely blocked by the plate body 6, so that the sealant in the nozzle 1 is prevented from being discharged.

For example, the plate body 6 and the discharge portion 7 are integrally formed.

In an embodiment of the present disclosure, during the horizontal movement of the plate body 6, sealant discharge or stopping of sealant discharge of the sealant outflow portion 2 can be controlled in time, avoiding a response delay problem occurring when an electromagnetic valve is used for control. In addition, when the sealant applying device provided by the embodiment of the present disclosure is used for sealing of the sealant, a sealant piling phenomenon cannot happen to a sealed position, and therefore uniformity of the sealant on substrates is guaranteed, and coating quality is improved.

What needs to be explained is that, in a process that the plate body 6 is switched to the second state from the first state, the surface on one side of the plate body 6 facing the sealant outflow portion 2 can sweep over the sealant outflow portion 2, and therefore the sealant left on the sealant outflow portion 2 can be effectively cleared away, and it can be effectively avoided that the sealant piling phenomenon happens to the sealant outflow portion 2.

However, when the plate body 6 is used for clearing up the sealant at a position of the sealant outflow portion 2, a certain amount of sealant may adhere to the surface on one side of the plate body 6 facing the sealant outflow portion 2, if the sealant is not cleared up in time, it is possible that the sealant is cured on the plate body 6, and therefore the horizontal movement of the plate body 6 is disadvantageously affected, and the sealant outflow portion 2 may be blocked.

In order to solve the above technical problem, for example, one side of the plate body 6 facing the sealant outflow portion 2 is provided with a clearing unit 13, the clearing unit 13 is configured to sweep over the surface on one side of the plate body 6 facing the sealant outflow portion 2 when the plate body 6 horizontally moves between the first state and the second state, and therefore the sealant left on the surface can be cleaned up. For example, the clearing unit 13 includes a cleaning sponge.

In a structure as illustrated in FIG. 2, the clearing unit 13 is located on a right side of the nozzle 1. However, the embodiment of the present disclosure is not limited thereto, the clearing unit 13 can be located on a left side of the nozzle 1, or the clearing unit 13 can be located on the left side and the right side of the nozzle 1.

In an exemplary application, when the plate body 6 is switched to the second state from the first state, part of the sealant is also left in the discharge portion 7 usually, if the sealant is piled up in the discharge portion 7 for a long time, it easily occurs that a phenomenon of blocking or sealant piling happens to the discharge portion 7, and therefore subsequent coating of the sealant is adversely affected.

In order to solve the above technical problem, according to an embodiment of the present disclosure, a suction unit is arranged at a first position in the sealant applying device, for example, the first position refers to a position where the through hole 8 is located when the plate body 6 is in the second state, and the suction unit is configured to perform a suction treatment on the discharge portion 7 when the plate body 2 is in the second state. For example, the suction unit is a vacuum suction unit. For example, the vacuum suction unit includes an air suction pipe 12 and a suction pump 11, the suction pump 11 is connected with one end of the air suction pipe 12, and the suction pump 11 performs a vacuumizing treatment on the air suction pipe 12.

When the plate body 6 is in the second state, the air suction pipe 12 is right opposite to the discharge portion 7, at the moment, the suction pump 11 performs the vacuumizing treatment on the air suction pipe 12, a certain pressure difference exists in the air suction pipe 12 compared to outside atmospheric pressure, and at the moment, the sealant left in the discharge portion 7 is suctioned away by the air suction pipe 12 to further avoid the problem of blocking or sealant piling that happens in the discharge portion 7.

As illustrated in FIG. 2, the clearing unit 13 and the suction unit are respectively located two opposite sides of the nozzle 1. However, the embodiments of the present disclosure is not limited thereto; the clearing unit 13 and the suction unit can be located on a same side of the nozzle 1; or a plurality of clearing units 13 can be arranged, part of the clearing units 13 and the suction unit are located on the same side of the nozzle 1, and the other part of the clearing units 13 and the suction unit are located on the two opposite sides of the nozzle 1.

For example, the sealant applying device further comprises a driving unit 10, the driving unit 10 is connected with the plate body 6, and the driving unit 10 is configured to drive the plate body 6 to horizontally move between the first state and the second state. In the embodiment of the present disclosure, by arranging the driving unit 10 configured to drive the plate body 6, a mechanical degree of overall apparatus can be effectively improved.

For example, the switch plate further includes: a connecting arm 9, one end of the connecting arm 9 is connected with the other end of the plate body 6, and the other end of the connecting arm 9 is connected with the driving unit 10. In this case, the driving unit 10 is connected with the plate body 6 through the connecting arm 9, the driving unit 10 drives the connecting arm 9 to move, and therefore the plate body 6 is driven to move correspondingly.

For example, the sealant applying device further comprises an air inlet unit 5, the air inlet unit 5 is connected with the air inlet portion 3 of the nozzle 1, and the air inlet unit 5 is configured to output air to the nozzle 1 so that there is a preset air pressure in the nozzle. In a whole coating process of the sealant applying device provided by the embodiment of the present disclosure, it is not needed to control the air outputting speed of the air inlet unit 5 by means of the electromagnetic valve, it is only needed to keep the output of the air inlet unit 5 continuous and constant, and therefore linearity of a coating state of the sealant is good.

An embodiment of the present disclosure provides a sealant applying device; by arranging the switch plate, a sealant discharging state of the sealant outflow portion 2 can be accurately controlled in time, and therefore the coating quality can be effectively improved.

Figure 4:
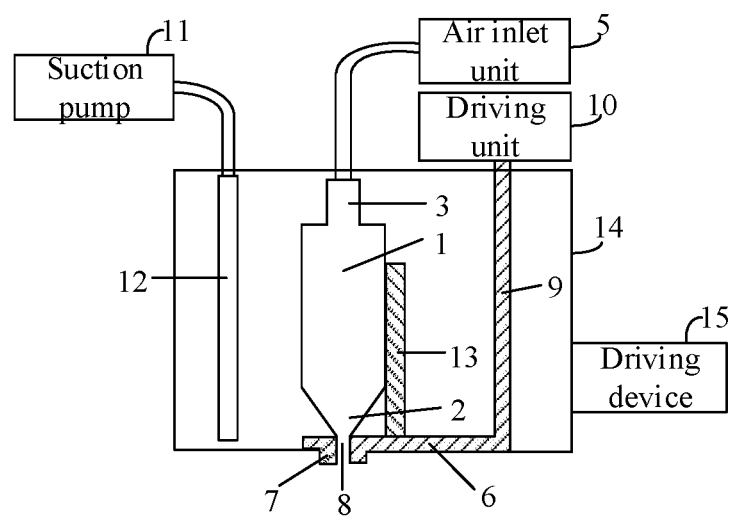
FIG. 4 is a structural schematic diagram of a sealant applying apparatus provided by an embodiment of the present disclosure.
Figure 5:
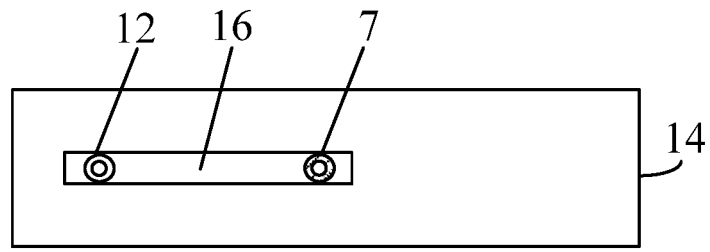
FIG. 5 is a schematic diagram of a bottom face of the sealant applying apparatus as illustrated in FIG. 4.

FIG. 4 is a structural schematic diagram of a sealant applying apparatus provided by an embodiment of the present disclosure, and FIG. 5 is a schematic diagram of a bottom face of the sealant applying apparatus as illustrated in FIG. 4. As illustrated in FIG. 4 and FIG. 5, the sealant applying apparatus comprises a sealant applying device, the sealant applying device as described above is adopted as the sealant applying device, and the above description can be referred to for details, which is not repeated any more herein.

For example, the sealant applying apparatus further comprises a protecting cavity 14, the sealant applying device is located in the protecting cavity 14, a bottom of the protecting cavity 14 is provided with a slide opening 16, and a discharge portion 7 horizontally moves in the slide opening 16. In the embodiment of the present disclosure, by arranging the protecting cavity 14, the sealant applying device can be effectively packaged and protected.

For example, the sealant applying apparatus further comprises a driving device 15, the driving device 15 is connected with the protecting cavity 14, and the driving device 15 is configured to drive the protecting cavity 14 to move. In an exemplary operation, a user can move the protecting cavity 14 to be above a position to be coated with sealant by operating the driving device 15, and then the sealant applying device is controlled to coat the sealant. In the embodiment of the present disclosure, a flexible degree of overall apparatus can be effectively improved by arranging the driving device 15.

In an exemplary application, when the sealant applying device includes a suction pump 11 and a driving unit 10, the volume and the mass of the suction pump 11 and the driving unit 10 are both great to some degree, which does not facilitate packaging or moving. For this purpose, in the embodiment of the present disclosure, an air suction pipe 12 and a connecting arm 9 can be placed in the protecting cavity 14, the suction pump 11 and the driving unit 10 are placed outside the protecting cavity 14, the air suction pipe 12 is connected with the suction pump 11, the driving unit 10 is connected with the connecting arm 9, and the connecting arm 9 is connected with a plate body 6.

An embodiment of the present disclosure provides a sealant applying apparatus, the sealant applying apparatus comprises the sealant applying device, by arranging a switch plate, a sealant discharging state of a sealant outflow portion can be accurately controlled in time, and therefore coating quality can be effectively improved.

Figure 6:
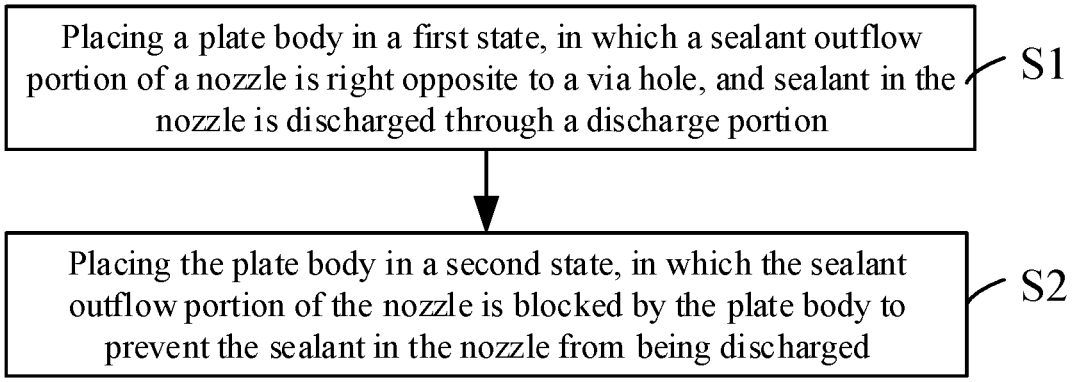
FIG. 6 is a flow diagram of a working method of a sealant applying device provided by an embodiment of the present disclosure.

FIG. 6 is a flow diagram of a working method of a sealant applying device provided by an embodiment of the present disclosure. As illustrated in FIG. 6, the sealant applying device as described above is adopted as the sealant applying device, and the above description can be referred to for details, which is not repeated any more herein. The working method of the sealant applying device comprises the following operations:

S1: placing a plate body in a first state, in which a sealant outflow portion of a nozzle is right opposite to a through hole, and sealant in the nozzle is discharged through a discharge portion.

S2; placing the plate body in a second state, in which the sealant outflow portion of the nozzle is blocked by the plate body to prevent the sealant in the nozzle from being discharged.

What needs to be explained is that, a sequential order of the above steps of S1 and S2 is not limited in the embodiment of the present disclosure.

By means of the working method of the sealant applying device provided by the embodiment of the present disclosure, start or stop of sealant discharge of the sealant outflow portion can be controlled in time, so as to avoid a response delay problem occurring when the electromagnetic valve is used for control.

The foregoing embodiments merely are exemplary embodiments of the disclosure, and not intended to define the scope of the disclosure, and the scope of the disclosure is determined by the appended claims.

The present application claims priority of Chinese Patent Application No. 201610052799.8 filed on Jan. 26, 2016, the disclosure of which is incorporated herein by reference in its entirety as part of the present application.

What is claimed is:

1. A sealant applying device, comprising a nozzle, wherein, the nozzle includes an air inlet portion and a sealant outflow portion, a switch plate is arranged below the sealant outflow portion, the switch plate includes a plate body configured to horizontally move between a first state and a second state, one end of the plate body is provided with a through hole, and a discharge portion is provided at a position corresponding to the through hole and on a side of the plate body facing away from the sealant outflow portion, in a case that the plate body is in the first state, the sealant outflow portion and the through hole are aligned with each other so that sealant in the nozzle is allowed to be discharged through the sealant outflow portion, the through hole and the discharge portion, and in a case that the plate body is in the second state, the sealant outflow portion is blocked by the plate body to prevent the sealant in the nozzle from being discharged;

in the case that the plate body is in the second state, the through hole is located at a first position, and a suction unit is arranged at the first position; and the suction unit is configured to perform a suction treatment on sealant left in the discharge portion in the case that the plate body is in the second state.

2. The sealant applying device according to claim 1, wherein, the suction unit includes an air suction pipe and a suction pump, and the suction pump is connected with one end of the air suction pipe; and the suction pump is configured to perform a vacuumizing treatment on the air suction pipe.

3. The sealant applying device according to claim 1, further comprising a clearing unit, wherein the clearing unit is located on one side of the nozzle, and is configured to clear a surface of a side of the plate body which faces the sealant outflow portion, during the plate body horizontally moving between the first state and the second state.

4. The sealant applying device according to claim 3, wherein the clearing unit comprises a cleaning sponge.

5. The sealant applying device according to claim 3, further comprising a driving unit, wherein the driving unit is connected with the plate body, and is configured to drive the plate body to horizontally move between the first state and the second state.

6. The sealant applying device according to claim 5, wherein the switch plate further includes a connecting arm, one end of the connecting arm is connected with an end, opposite to the one end of the plate body, of the plate body provided with the through hole, and an end, opposite to the one end of the connecting arm, of the connecting arm is connected with the driving unit.

7. The sealant applying device according to claim 1, further comprising a driving unit, wherein the driving unit is connected with the plate body, and is configured to drive the plate body to horizontally move between the first state and the second state.

8. The sealant applying device according to claim 7, wherein the switch plate further includes a connecting arm, one end of the connecting arm is connected with an end, opposite to the one end of the plate body, of the plate body provided with the through hole, and an end, opposite to the one end of the connecting arm, of the connecting arm is connected with the driving unit.

9. The sealant applying device according to claim 1, further comprising an air inlet unit, wherein the aft inlet unit is connected with the air inlet portion of the nozzle, and the air inlet unit is configured to output air to the nozzle to allow a preset air pressure in the nozzle.

10. The sealant applying device according to claim 1, wherein the discharge portion and the plate body are integrated.

11. A sealant applying apparatus, comprising the sealant applying device according to claim 1 and a protecting cavity, wherein the sealant applying device is located in the protecting cavity, a bottom of the protecting cavity is provided with a slide opening, and the discharge portion is located in the slide opening.

12. The sealant applying apparatus according to claim 11, further comprising a driving device, wherein the driving device is connected with the protecting cavity, and the driving device is configured to drive the protecting cavity to move.

13. A working method of a sealant applying device, wherein the sealant applying device is that according to claim 1, and the working method of the sealant applying device comprises:

placing the plate body in the first state, in which the sealant outflow portion and the through hole are aligned with each other so that the sealant in the nozzle is discharged through the sealant outflow portion, the through hole and the discharge portion; and placing the plate body in the second state, in which the sealant outflow portion of the nozzle is blocked by the plate body to prevent the sealant in the nozzle from being discharged.

* * * * *